Feb. 15, 1966 J. N. COOPER 3,234,666
TEACHING MACHINE
Filed Oct. 21, 1963
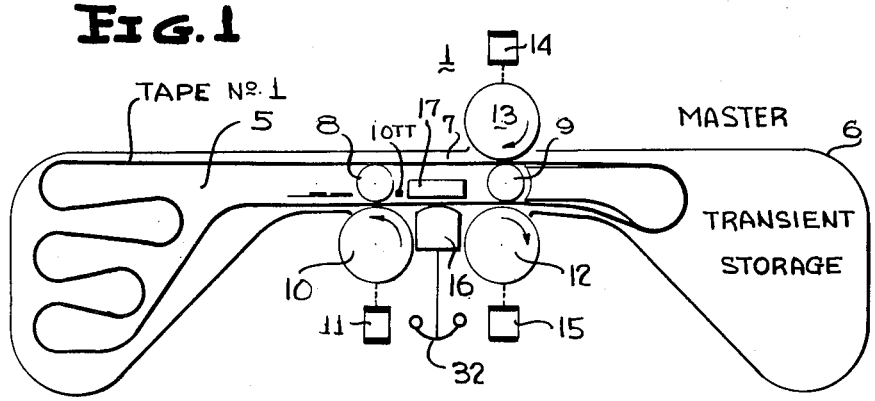
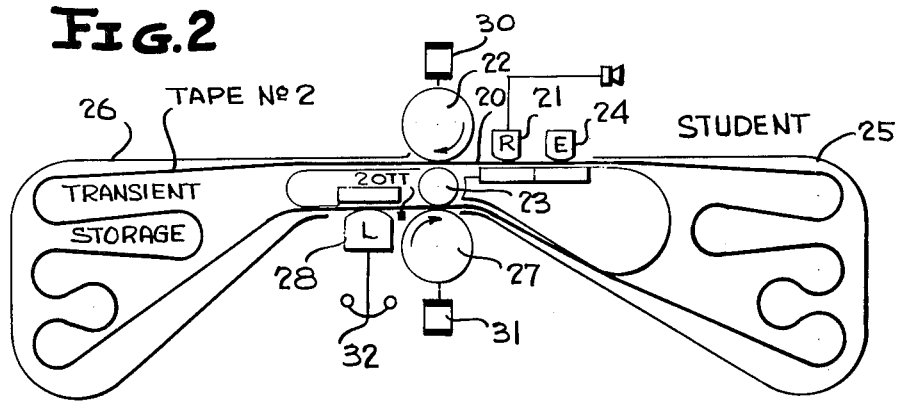
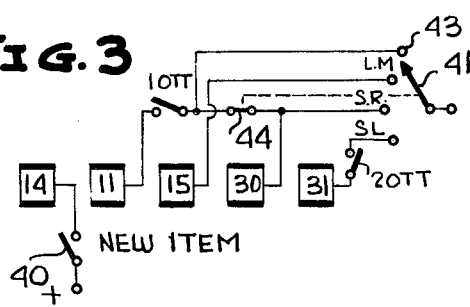
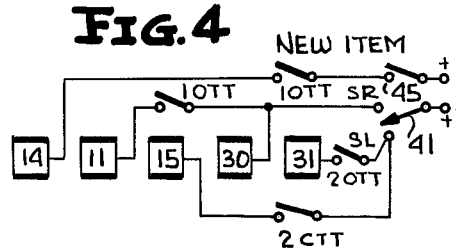
INVENTOR
JAMES N. COOPER
BY *Hurvitz & Rose*
ATTORNEYS United States Patent Office 3,234,666
Patented Feb. 15, 1966

3,234,666
TEACHING MACHINE
James N. Cooper, Hyattsville, Md., assignor of one-third to Hyman Hurvitz, Washington, D.C.
Filed Oct. 21, 1963, Ser. No. 317,840
4 Claims. (Cl. 35—35)

The present invention relates generally to magnetic tape recorders, and more particularly to language teaching machines employing tape recorders.

The process of teaching languages by means of magnetic tape machines involves the prerecording of correct sounds of items such as words, phrases, or the like on a master tape, and provision for a student to hear each item, to record it, and to hear his own recording. Following this he may hear a correct version from the master tape, as a confirmation of his own performance. Variations of this general sequence are preferred by various educators, but the specified sequence is a preferred sequence.

In teaching languages by means of tape recorders, certain pedagogical problems must be solved, as well as an economic problem. The usual tape recorder system employed for teaching languages, and the like, contains prerecorded lesson material, programmed for a predetermined number of repetitions of each bit of lesson material. The latter may consist of words, sounds or sentences, which normally (in the case of sentences) subsist for short periods of less than seven seconds. Some students require fewer repetitions and some more than are provided in the lesson material, but any given lesson material contains a pre-selected number of these according to prior art principles, and no deviations from this number are available.

Therefore, for the given number of repetitions, either time is wasted, if the student is quick, and requires fewer repetitions, or, if he is slow, and requires more repetitions, he fails to learn. It is an object of the present invention to provide a teaching machine capable of providing any desired number of repetitions of each item, under control of the pupil, when the item is contained only once on a master tape.

The usual procedure in employing tape machines for teaching language is to reproduce a phrase from a master tape, to have the student record his concept of the phrase, to have the student listen to the phrase as provided by the master and then as recorded by student, for comparison, and to repeat this process or sequence a predetermined number of times, deemed adequate to enable the student to record at the last a satisfactory duplication of the phrase as presented by the master tape. If more than a second intervenes between the end of the reproduction of the phrase from the master tape and from the student's recording the teaching process will be reduced in ineffectiveness. Similar ineffectiveness results if the student must manipulate the tape machine in a manner requiring thought and attention.

It is an object of the present invention to provide a tape machine for teaching, in which initiation of successive reproductions of master material, student recording and reproduction of student recorded material can be accomplished with substantially no delay, if desired, in response to transient actuation of a switch for each event and in which terminations of each listening operation may be automatic.

A further difficulty in the tape machine teaching art involves the economics of the machines. The conventional machine requires tape reel reversal mechanism, presence of which accounts for a major portion of the maintenance costs pertaining to the machine. It is a feature of the present invention to provide a tape machine having provision for indefinitely repeated reproductions of a master phrase, each followed by recordings and/or reproductions of student copies of the phrase, in which no tape reel reversals are required, and in which no tape reel starts are required, with consequent jerkiness of recording and reproduction. If tape reels are employed, it is as storage elements for tape, and not as item to item operating elements.

Briefly describing a teaching machine according to the invention, two tapes are provided, a master tape and a student tape, each tape having two drives. If desired the tapes may be endless. Adjacent the first drive, for the student tape, is located a record head and adjacent the second drive a read-out head. Intermediate the record and read-out head is located a tape loop storage bin. The tape feeds are operable separately or in any combination, at will, by means of solenoid operated (or hand operated) pinch rollers.

The master tape is fed back and forth with respect to a listen head, into transient storage in a bin during read out, and out of the bin to feed the tape back into its initial position for a subsequent read out. Logic circuitry is provided for controlling the pinch rollers of the master and student sections of the machine to perform desired teaching sequences.

In operation, master material is supplied to tape #1, on a length of tape in a storage bin. The tape is fed out into a second transient storage bin. The student listens to the item read-out from the master tape while it is feeding into transient storage, and then seeks to duplicate the material while recording onto tape #2, on a length of tape which is fed into a transient storage bin. He then listens to a reproduction of his own recording, while feeding tape #2 out of the transient storage. During the student's operations the master tape is returned to its original position. The student then listens to the master tape as it is again fed out of storage, to provide a confirmation of this own performance. This process can be repeated as many times as desired.

It is, accordingly, a broad object of the invention to provide a novel teaching aid employing pre-recorded material.

It is another object of the invention to provide a teaching system enabling any desired number of repetitions of a teaching sequence, with minimum manipulation of controls by a student, and with negligible time delays between elements of the sequence.

It is another object of the invention to provide a system of teaching by means of a tape machine in which only one recording of each item of the master material is required, although more than one may be employed.

A further object of the invention involves the provision of a teaching system requiring no tape reels in a tape machine.

The above and still further objects, features and advantages of the present invention will become apparent upon consideration of the following detailed description of one specific embodiment thereof, especially when taken in conjunction with the accompanying drawings wherein:

FIGURE 1 is a view in plan of a tape recorder section pertaining to master tape readout;

FIGURE 2 is a view in plan of a student section; and

FIGURES 3 and 4 are schematic circuit diagrams of alternative switching systems for controlling the systems of FIGURES 1 and 2.

Referring now to the accompanying drawings, 1 denotes a master section of a machine for at will reproducing pre-recorded individual items from a tape #1, repeating the reproduction at will as many times as desired. 2 denotes a student section of the machine, on which the student records his impression of the item reproduced, and listens to his recording immediately after recording. Machine sections 1 and 2 are so integrated that they make possible the following sequences, repeated as many times as desired.

Student Listen to Master
Student Record Impression of Master
Student Listen to His Recording
Student Compare by Listening to Master Other sequences are possible by re-arranging the logic of the system.

In FIGURE 1, relating to the master section of the machine, 5 is a storage bin containing a master tape on which is recorded a large number of items, i.e. sounds, words, phrases, sentences, or the like. 6 is a transient bin into which tape 7 can be pushed and from which it can be withdrawn. Two capstans are provided, 8 and 9, of which 8 includes no flywheel and is fast, being used solely to rapidly withdraw tape from transient storage 6, whereas 9 is fly-wheeled and operates at constant accurate speed, say 7½ inches per second, without flutter. Associated with capstan 8 is a pinch roller 10 operated by a solenoid 11. Associated with capstan 9 are two pinch rollers, 12 and 13, operated by solenoids 14 and 15, on opposite sides of the capstan 9. Pinch roller 12, when energized, pushes tape into transient storage 6, while pulling the tape past a listen head 16, associated with pressure pad 17. Pinch roller 13 pulls the tape out of storage 6, and so also does pinch roller 10, but the latter rapidly pulls the tape back across the head 16 for replay, while roller 13 pulls the tape out of storage 6 and into storage 5 after it has been readout as many times as desired. Pinch roller 13 operates from capstan 9 only for convenience and economy, and could well operate from a fast capstan, if desired.

In operation, we assume a series of items recorded in sequence on a master tape 7 in storage 5, the tape being endless and extending from storage 5 past pinch rollers 10 and 12 into storage 6 and thence looping back past pinch roller 13 into storage 5. The student actuates roller 12 to read out an item via head 16, the tape storing in storage 6 and this being all the tape there stored except for enough tape to complete the endless loop of tape. After he has completed readout he actuates pinch roller 10 to re-position the tape in storage 5, for repetition of readout. The tape automatically returns to its original position, ready for replay of the item, there being a tape tension switch 10TT, which opens and disables the pinch roller when the tape is fully pulled back. The same item may thus be accurately readout, as many times as desired, and on pull back the tape will have automatically positioned itself for replay. When an item has been read out as many times as desired, and assuming it is then in storage 6, solenoid 14 actuates roller 13 to pull the item back into storage 5. We thus assume that the last previous operation had fed the item into storage 6 without pull back, and the control logic for the system must operate accordingly.

After listening to each master item, the student repeats his impression of it on endless tape 20, in machine 2, by means of record head 21 and pinch roller 22 operating with capstan 23. Associated with record head 21 is the usual erase head 24. In so recording the student pulls a length of tape 20 out of storage 25 and pushes it into storage 26. The student then listens to his own recording by operating pinch roller 27 to pull the length of tape out of storage 26 into storage 25 past listen head 28. He always pulls out of storage 26 precisely what he pushed into storage 26 on recording, and therefore always reads out exactly what he has recorded, and can repeat the process indefinitely. Roller 22 is actuated by solenoid 30 and roller 27 by solenoid 31. The same phones 32 are employed for both listen head 16 and 28, and also the same amplifier (not shown) if desired, since these heads never operate simultaneously. It will be recognized that all material recorded by the student must be fed into storage 26, and therefore that roller 22 must continue to operate for a time after recording is complete.

Two forms of logic for the system of FIGURES 1 and 2 are provided in FIGURES 3 and 4, many alternatives being feasible.

In FIGURE 3, on closure of switch 40 solenoid 14 is energized to pull an item, previously listened to at the end of a sequence, out of storage 6, thereby placing a new item into readout position. If storage 6 is empty at the time it indicates that roller 12 must be operated first to place the last used old item into storage.

Assuming a new item is in position, the student operates switch arm 41 to contact labeled LM for Listen to Master. This energizes solenoid 15, which pulls the previously positioned master item past head 16 into transient storage 6. When the item has been read out, the student actuates the switch arm 41 to student record or SR position, which energizes solenoids 11 and 30, 10TT being then closed since the master tape is lax. Solenoid 11 pulls the master item back into position for re-listen, while solenoid 30 pulls tape past record head 21 into transient storage 26, while the student records his impression of the master. Tape tension switch 10TT opens when the master tape is taut, automatically disabling solenoid 11 and thus pinch roller 10.

When the student has finished recording he moves switch arm 41 to the SL contact, i.e. Student Listen, which actuates solenoid 31, and feeds the student tape 20 out of storage 25 into storage 26 while the student listens via the phones 32, and listen head 28. When the tape is taut, at the end of the listen operation, tape tension switch 20TT opens the circuit.

The student now moves arm 41 back to contact LM to confirm by listening to the latter master tape. The latter is then fed back for repetition of the sequence by bringing arm 41 to contact 43 to energize solenoid 11 and reposition the master. Contact 43 proceeds via now closed switch 10TT to solenoid 11, and the switch opens when the tape is tensioned. Operation of arm 41 to position 43 opens switch 44 to disable solenoid 30, while the master tape is being repositioned. The sequence is now complete and can be repeated at will. Any necessity for contact 43 and switch 44 can be avoided by recording the master items twice on the tape, since then contact LM permits listening to the record item for confirmation without feed-back of the master tape.

In the system of FIGURE 4, an additional degree of automation is added to the systems of FIGURE 3, by the provision of switch 2CTT between SL terminal and solenoid 15. The tape tension switch 20TT for the student section is double throw, and its alternative position is labeled 2CTT to indicate that the contacts 2CTT are closed when the tape is tensioned, i.e. when 20TT opens. At this time solenoid 15 is energized, so that on student listen, when listening is complete and all the recorded portion of tape 20 is fed out of storage 25, the master tape automatically begins its feed for the Student Listen to Master Operation. It follows that only an SR and SL switch position is required for routine operation, and a separate new item position, 45. The latter switch position controls only solenoid 14, and its circuit breaks when tape 1 is taut, by means of 10TT (duplicated). On placing arm 41 in SL position, solenoid 31 remains de-energized, since the student tape is taut, while a circuit to solenoid 15 is closed for the same reason. An item of master material then feeds into storage, and is listened to, following which the student switches to SR. 10TT is now closed, so that solenoid 11 feeds back the master tape and opens when taut due to 10TT. Simultaneously, solenoid 30 is energized and the student talks. When he has finished he moves switch arm 41 to SL position, whereupon 20TT being closed, solenoid 31 energizes and he listens to his own recording. When he has completed listening 20TT opens and 2CTT closes, energizing solenoid 15 and feeding through the master item for confirmation.

In this system, two master items are used, on the master tape. Therefore, merely by keeping switch arm 41 in the SL position, the second duplicate item is reproduced, and a new sequence is started, with no interruption for tape feed-back.

There is a difficulty in the above systems, which must be accounted for. This involves the distance between the record and listen heads, along the tape, in the student machine. The total distance may be made small in an actual machine, say one inch. This is about $\frac{1}{7}$ second, for a 7½″/sec. tape. The student can be counted on to delay his switch operation this long after he has stopped talking, or a delay relay can be interposed in the student record solenoid circuit to hold it operated after its switch is opened, to assume that all recorded material finds its way to transient storage 26.

The system disclosed herein can be used not only for teaching pronunciation, but may also be used to teach the language itself and this may be accomplished in either of two ways. To go back, in teaching pronunciation, each item may be recorded twice, on the master tape. The first repetition of the item is transcribed at the beginning of a sequence and the second at the end, the intermediate part of the sequence involving student record, and student listen to own recording. In teaching meaning on the other hand, the two items of a sequence recorded on the master tape may be A (1) an English item (2) its translation into a foreign language; or B (1) an item in a foreign language and (2) its translation into English. In the A sequence the student actions intermediate $A_1$ and $A_2$ are (1) record translation into foreign language (2) listen to own recording. For the B sequence (1) record foreign word and English translation (2) listen foreign word and English translation.

In both cases the student obtains confirmation of his pronunciation and also of his translation. The A and B sequences can be carried out without change of circuitry or logic, in the basic recording system, by changing the content of the master tape.

However, when an English speaking person learns English translations of foreign words, one may use the sequence (1) Listen foreign word as recorded on master tape (2) student record a proposed English translation (3) student listens to the correct English translation as recorded on master. This sequence is acceptable to some teachers, but it fails to provide any practice in pronouncing the foreign words involved, and also in some circles it is believed desirable to associate the foreign and English words in the pupil's mind by forcing him to say both in turn. The first suggested procedure (1) causes the pupil to pronounce the foreign word in juxtaposition to the English word, and then to listen to them in juxtaposition, after which he receives confirmation. The confirmation may consist precisely in a duplication of the material recorded by the student, i.e. the foreign word followed by the English word.

As a very short pedagogical procedure, the student may listen to the foreign word, speak the English translation into the student recorder, and then hear the correct translation from the master tape. This procedure may be inverted in learning the foreign language.

The machine cannot only be programmed in respect to languages, but also in respect to music. For example, each master item of music may be part of a long musical selection as recorded by a skilled musician. The student may listen to any desired phrase or other portion of the selection, play it himself, listen to his own playing and then hear the master recording of the phrase again. He can repeat the procedure as to any one phrase as often as he pleases.

It is entirely feasible to eliminate the confirmation, using the first master playback of a subsequent repetition of a sequence to serve also as confirmation thereby reducing the total time of listening to the master by half and reducing the total time of getting through a lesson by 25%.

Still further, it is feasible to play a phrase in synchronism with its reproduction from the master and then to listen to the student's recording and the master recording alone, in succession. This technique can also be used in language pronunciation training. For example, the sequence may be (1) listen to master and student record while listening to the master (2) student listen to himself alone (3) student listen to master alone.

In short, the machine and its basic capability of student recording, student listening to a master and student listening to himself, without appreciable time gaps, without distracting manipulation of a machine, and for as many repetitions as desired, lends itself to a wide variety of pedagogical tasks, carried out rapidly and with maximum learning efficiency.

The system can be used for training in public speaking, acting, linguistics, music, correct pronunciation of words, speech therapy, learning medical sounds, e.g. patterns of heart beats associated with various diseases, Morse code, radio communication, through noise or recognition of sonar sounds through interference. The taped information may be video, i.e. coded audio material may represent a visual pattern, and the system may be used for training in recognition of these. The tape involved may be video tape, and the system used in training to recognize ships, or aircraft. Soldiers may be trained to recognize sound patterns, i.e. guns, engines, and the like. Musicians, actors and public speakers, instead of using the machine to copy, can dispense with the master tape and merely record and reproduce a musical phrase, or a verbal phrase, over and over again, until satisfied with its effect. By the use of video tape, students may be taught flag or blinker communication as practised in the Navy. Complex mechanical tasks may be taught by means of a video tape, video recorder and video tape reproducer replacing their audio counterparts.

It is also possible to construct hybrid systems, in which, for example the master machine operates on motion picture film or a succession of frames, while the student machine is a tape machine as above described. The basic concepts of the macihne thus extend to audio-visual, and visual, as well as purely audio aids. Each frame of a master audio tape may be synchronized with a frame of a motion picture machine, to supplement the audio material or to replace some of it. For example, in teaching a foreign language, a picture may be shown, the student may state the foreign name of the object into a recorder, listen to his recording and thereafter the master tape may provide confirmation, and the student may repeat this procedure until he has the correct name and its pronunciation, when he may request a new item on the master tape conjointly with a new picture, and repeat the procedure. Thereby he learns without ever using an English word. A foreign student learning to read English with correct intonations may read a sentence from a book or from a projected slide or film frame, hear his recording, and then hear the same sentence as correctly rendered by a master tape. The use of film lends itself to class rather than individual teaching. If the master section of the system alone is used, it may be employed to transmit sequentially and repetitively sections of a film, of a dance, as danced by a professional, together with the music, so that a student dancer can practice again and again each phrase of the dance. Or the film can be used to teach the standard ballet positions, or motions. Similarly, the master part of the machine alone can be used in music teaching by repeating a musical phrase again and again, the student either playing following each playback, or in synchronism therewith, as he wishes.

The range of uses of the machine, taken altogether, or the master section alone or the student section alone, is limited only by the imagination of the pedagogue or trainer.

While I have described and illustrated one specific embodiment of my invention, it will be clear that variations of the details of construction which are specifically illustrated and described may be resorted to without departing from the true spirit and scope of the invention as defined in the appended claims.

I claim:
1. In a teaching machine having a first strip on which are recorded in succession along the strip a variety of items of first information, and also having a second strip on which information may be recorded and thereafter reproduced, and also having first means for readout of said items of first information, the combination of a two-position control device, second means responsive to actuation of said device to one of its two positions for providing operation of said first means to read out one of said items of information, third means responsive to actuation of said device to the other of said two positions for providing a first actuation of said second strip during a record operation, fourth means responsive to actuation of said device to said one of said positions for repeating said first actuation of said second strip and on completion of said repeating automatically to again read out said one of said items of information.

2. In a two-tape handling machine, a first storage for one of said tapes, a second storage for the other of said tapes, a two-condition device, means responsive to said device in one of its two conditions for feeding a point of one of said tapes from an initial position into said first storage continuously in a first path while said device is in said one of its two conditions, means responsive to placing said device in the other of said two conditions for terminating motion of said first tape into said storage and pulling said tape out of said first storage in said first path in a first sense and initiating motion of said second tape into said second storage, means responsive to re-attainment of said initial position by said first tape for terminating said pulling out of said first tape, means responsive to placing said device again in said first position for moving only the portion of said second tape theretofore placed in said second storage in said first sense out of said second storage, and means responsive to completion of movement of said portion of said second tape out of said second storage for again feeding said point of said first tape into said first storage.

3. In a teaching machine employing a master tape containing discrete random length items of pre-recorded material, and a blank student tape, a first readout head for said master tape, a record head and a second readout head for said student tape, means including said first readout head for reading out an item from said master tape, means for thereafter at will recording via said record head on said student tape and for immediately thereafter reading out the recording on said student tape regardless of the length of the recording on said student tape, said last means further comprising means for re-positioning the master tape with respect to said readout head for a further readout of said an item, and means for automatically initiating said further readout of said an item from the master tape in response to completion of readout of the recording on said student tape.

4. In a system for repeatedly reading discrete items pre-recorded on a master strip, a transient storage bin, first means including a capstan drive for feeding a length of said master tape from a first position into said transient storage bin in a first direction along a first path while reading out one of said discrete items, second means including a capstan drive for pulling said length of said master tape out of said transient storage bin in a direction opposite to said first direction along said first path and to said first position, means responsive to attainment of taut tape in said transient storage bin for terminating operation of said second means, and means operative when said strip is in said transient storage bin and including said first capstan drive for feeding said strip out of said storage bin in a second path distinct from said first path.

References Cited by the Examiner
UNITED STATES PATENTS

| | | | |
|---|---|---|---|
| 2,777,901 | 1/1957 | Dostert | 35—35.3 X |
| 2,876,561 | 3/1959 | Horne | 35—35.3 |
| 3,155,778 | 11/1964 | Meyer | 35—35.3 X |
| 3,156,052 | 11/1964 | Irazoqui | 35—35.3 |

EUGENE R. CAPOZIO, *Primary Examiner.*

LAWRENCE CHARLES, *Examiner.*